US011199745B2

(12) United States Patent
Osato et al.

(10) Patent No.: US 11,199,745 B2
(45) Date of Patent: Dec. 14, 2021

(54) LIQUID CRYSTAL DISPLAY DEVICE

(71) Applicant: ZEON CORPORATION, Tokyo (JP)

(72) Inventors: Kazuhiro Osato, Tokyo (JP); Kazuki Takagi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 277 days.

(21) Appl. No.: 15/751,251

(22) PCT Filed: Aug. 8, 2016

(86) PCT No.: PCT/JP2016/073347
§ 371 (c)(1),
(2) Date: Feb. 8, 2018

(87) PCT Pub. No.: WO2017/026459
PCT Pub. Date: Feb. 16, 2017

(65) Prior Publication Data
US 2018/0239199 A1    Aug. 23, 2018

(30) Foreign Application Priority Data

Aug. 13, 2015 (JP) .............................. JP2015-159929

(51) Int. Cl.
*G02F 1/13363*  (2006.01)
*G02B 5/30*     (2006.01)
(Continued)

(52) U.S. Cl.
CPC .... *G02F 1/133634* (2013.01); *B29D 11/0073* (2013.01); *G02B 5/3025* (2013.01);
(Continued)

(58) Field of Classification Search
CPC .......... B29D 11/00644; B29D 11/0073; G02F 1/133634; G02F 1/133514;
(Continued)

(56) References Cited

U.S. PATENT DOCUMENTS

| 6,115,095 A | 9/2000 | Teruaki et al. |
| 2005/0140900 A1 | 6/2005 | Jeon et al. |

(Continued)

FOREIGN PATENT DOCUMENTS

| JP | H11133408 A | 5/1999 |
| JP | 2006524347 A | 10/2006 |

(Continued)

OTHER PUBLICATIONS

Oct. 25, 2016, International Search Report issued in the International Patent Application No. PCT/JP2016/073347.

(Continued)

*Primary Examiner* — Michael H Caley
*Assistant Examiner* — Agnes Dobrowolski
(74) *Attorney, Agent, or Firm* — Kenja IP Law PC

(57) ABSTRACT

A liquid crystal display device includes, in this order from a light source side: a first polarizer; a liquid crystal cell in which an azimuth orientation direction of a liquid crystal substance is altered by an electric field parallel to a display surface; and a second polarizer. Absorption axes of the first and second polarizers are disposed in directions orthogonal to each other. The absorption axis of the first polarizer and an orientation axis of molecules of the liquid crystal substance are disposed in parallel to each other. The device further includes: a first substrate layer between the liquid crystal cell and the first polarizer; and no substrate layer or a second substrate layer as only one layer between the liquid crystal cell and the second polarizer. An in-plane direction of an optical axis of the first substrate layer is parallel to the absorption axis of the first polarizer.

5 Claims, 3 Drawing Sheets

(51) Int. Cl.
  *B29D 11/00* (2006.01)
  *G02F 1/1337* (2006.01)
  *G02F 1/1335* (2006.01)
  *G02F 1/1343* (2006.01)

(52) U.S. Cl.
  CPC ......... *G02B 5/3033* (2013.01); *G02F 1/1337* (2013.01); *G02F 1/133514* (2013.01); *G02F 1/133528* (2013.01); *G02F 1/134363* (2013.01); *B29D 11/00644* (2013.01); *G02B 5/3083* (2013.01); *G02F 1/13363* (2013.01); *G02F 1/133635* (2021.01); *G02F 2202/40* (2013.01)

(58) Field of Classification Search
  CPC ......... G02F 1/133528; G02F 1/134363; G02F 1/1337; G02F 1/133635; G02F 1/13363; G02F 2202/40; G02B 5/3033; G02B 5/3025; G02B 5/3083; G02B 5/30
  See application file for complete search history.

(56) References Cited

U.S. PATENT DOCUMENTS

| | | | |
|---|---|---|---|
| 2009/0059134 A1* | 3/2009 | Ishikawa | G02F 1/134363 349/96 |
| 2010/0202051 A1* | 8/2010 | Yoshimi | G02B 5/305 359/489.2 |
| 2010/0271573 A1* | 10/2010 | Sakai | G02F 1/13363 349/96 |
| 2010/0309414 A1* | 12/2010 | Tomonaga | G02B 5/3041 349/96 |
| 2012/0200811 A1* | 8/2012 | Sakai | G02F 1/13363 349/102 |

FOREIGN PATENT DOCUMENTS

| | | | |
|---|---|---|---|
| JP | 2007017466 A | 1/2007 | |
| JP | 2009075549 A | 4/2009 | |
| JP | 2009139747 A | 6/2009 | |
| JP | 2009258411 A | 11/2009 | |
| TW | 200923446 A | 6/2009 | |
| TW | 201423174 A | 6/2014 | |
| WO | 2012002667 A2 | 1/2012 | |
| WO | WO2012002667 * | 1/2012 | ........... G02F 1/1335 |
| WO | 2014088273 A1 | 6/2014 | |

OTHER PUBLICATIONS

Feb. 13, 2018, International Preliminary Report on Patentability issued in the International Patent Application No. PCT/JP2016/073347.

Nov. 25, 2019, Office Action issued by the Taiwan Intellectual Property Office in the corresponding Taiwanese Patent Application No. 105125390.

* cited by examiner

LIQUID CRYSTAL DISPLAY DEVICE

FIELD

The present invention relates to a liquid crystal display device.

BACKGROUND

There are known a variety of modes for liquid crystal display devices. Among these, a liquid crystal display device of a mode in which the azimuth orientation direction of a liquid crystal substance in a liquid crystal cell is altered by an electric field which is parallel to the display surface, such as a so-called IPS (in-plane switching) mode, has advantageous characteristics such as having a wide viewing angle. Liquid crystal display devices of a variety of modes including the IPS mode usually have polarizers disposed on both of the light source side and the viewing side of the liquid crystal cell. Furthermore, it is known that a layer having a variety of optical functions is disposed between the liquid crystal cell and the polarizer (for example, Patent Literatures 1 and 2).

In most of cases, the polarizer is a layer obtained by stretching an iodine-impregnated polyvinyl alcohol. Such a layer usually does not have strength that enables independent handling. Therefore, it is common practice that a polarizing plate formed by bonding protective films to both surfaces of such a polarizer is used for assembling a liquid crystal display device.

CITATION LIST

Patent Literature

Patent Literature 1: Japanese Patent Application Laid-Open No. Hei. 11-133408 A (corresponding publication: U.S. Pat. No. 6,115,095)

Patent Literature 2: Japanese Translation of PCT International Application Publication No. 2006-524347 A (corresponding publication: U.S. Published Patent Application No. 2005/140900)

SUMMARY

Technical Problem

As such protective films, an inexpensive general-purpose TAC (triacetyl cellulose) film is often used. However, such a TAC film has a phase difference in a thickness direction in most of cases. Therefore, in a case where such a TAC film is located on the inside of a polarizer (that is, between a pair of polarizers), coloring is caused when the display surface is observed in an oblique direction. Such coloring becomes a problem of degrading the display quality when a black image is displayed on a liquid crystal display device.

As a method for avoiding such coloring, it is contemplated that a so-called zero phase difference film having an extraordinarily low phase difference is employed as the protective film on the inside of a polarizer, on each of the source side and the viewing side. However, for the zero phase difference film, it is necessary to select the material and manufacturing process which reduce the expression of the phase difference. Therefore, it is difficult to achieve inexpensive and efficient production.

Another known method for avoiding coloring is employment of a zero phase difference film as a protective film on the inside of a polarizer on the light source side, while a positive B layer (a layer in which refractive indices nx, ny, and nz satisfy nz>nx>ny) is employed as a protective film on the inside of a polarizer on the viewing side, and a negative B layer (a layer in which refractive indices nx, ny, and nz satisfy nx>ny>nz) is disposed in combination with the positive B layer to thereby perform optical compensation. However, when such a configuration is employed, it is necessary to form each of the layers and bond the layers while positioning the optical axes thereof. Therefore, it is again difficult to achieve inexpensive and efficient production of the liquid crystal display device.

Therefore, an object of the present invention is to provide a liquid crystal display device which has favorable display quality and can be produced in an inexpensive and efficient manner.

Solution to Problem

The present inventor has conducted research for solving the aforementioned problem. As a result, the present inventor has unexpectedly found that the coloring when the display surface is observed in an oblique direction can be reduced to a similar degree to that when the zero phase difference film is employed, by a specific configuration in the liquid crystal display device of a mode in which the azimuth orientation direction of a liquid crystal substance in a liquid crystal cell is altered by an electric field parallel to the display surface, wherein the specific configuration includes disposal of a substrate layer of which the in-plane direction of the optical axis is parallel to the absorption axis of the polarizer on the light source side as a protective film on the inside on the light source side. The present inventor has further found that thereby there can be configured a liquid crystal display device which can be produced in an inexpensive and efficient manner while having favorable display quality. Thus, the present invention has been accomplished.

That is, according to the present invention, the following (1) to (9) are provided.

(1) A liquid crystal display device comprising:
  a first polarizer;
  a liquid crystal cell in which an azimuth orientation direction of a liquid crystal substance is altered by an electric field parallel to a display surface; and
  a second polarizer, which are disposed in this order from a light source side, wherein
  an absorption axis of the first polarizer and an absorption axis of the second polarizer are disposed in directions orthogonal to each other, and
  the absorption axis of the first polarizer and an orientation axis of molecules of the liquid crystal substance of the liquid crystal cell are disposed in parallel to each other,
  the liquid crystal display device further comprises:
    a first substrate layer between the liquid crystal cell and the first polarizer; and
    no substrate layer or a second substrate layer as only one layer between the liquid crystal cell and the second polarizer, and
  an in-plane direction of an optical axis of the first substrate layer is parallel to the absorption axis of the first polarizer.

(2) The liquid crystal display device according to (1), comprising the second substrate layer as the one layer between the liquid crystal cell and the second polarizer, wherein an in-plane direction of an optical axis of the second substrate layer is parallel to the absorption axis of the second polarizer.

(3) The liquid crystal display device according to (1), comprising the second substrate layer as the one layer between the liquid crystal cell and the second polarizer, wherein the second substrate layer is a layer having no phase difference.

(4) The liquid crystal display device according to (1) or (2), comprising the second substrate layer as the one layer between the liquid crystal cell and the second polarizer, wherein one or both of the first substrate layer and the second substrate layer are formed of a material having a positive intrinsic birefringence value.

(5) The liquid crystal display device according to any one of (1), (2), and (4), comprising the second substrate layer as the one layer between the liquid crystal cell and the second polarizer, wherein an NZ factor of the first substrate layer and an NZ factor of the second substrate layer both fall within a range of 0.9 to 1.5.

(6) The liquid crystal display device according to (1) or (2), comprising the second substrate layer as the one layer between the liquid crystal cell and the second polarizer, wherein one or both of the first substrate layer and the second substrate layer are formed of a material having a negative intrinsic birefringence value.

(7) The liquid crystal display device according to any one of (1), (2), and (6), comprising the second substrate layer as the one layer between the liquid crystal cell and the second polarizer, wherein an NZ factor of the first substrate layer and an NZ factor of the second substrate layer both fall within a range of −0.5 to 0.1.

(8) The liquid crystal display device according to any one of (1) to (7), wherein the first polarizer and the first substrate layer are a first co-stretched polarizing plate obtained by a step of stretching a first pre-stretch layered body containing a first hydrophilic polymer layer and a first pre-stretch film to obtain a first stretched layered body.

(9) The liquid crystal display device according to any one of (1) to (7), wherein the first polarizer and the first substrate layer are a first co-stretched polarizing plate obtained by a step of stretching a first pre-stretch layered body containing a first hydrophilic polymer layer and a first pre-stretch film to obtain a first stretched layered body, and the second polarizer and the second substrate layer are a second co-stretched polarizing plate obtained by a step of stretching a second pre-stretch layered body containing a second hydrophilic polymer layer and a second pre-stretch film to obtain a second stretched layered body.

Advantageous Effects of Invention

The liquid crystal display device according to the present invention can be a liquid crystal display device which has favorable display quality and which can be produced in an inexpensive and efficient manner.

DESCRIPTION OF EMBODIMENTS

Figure 1:
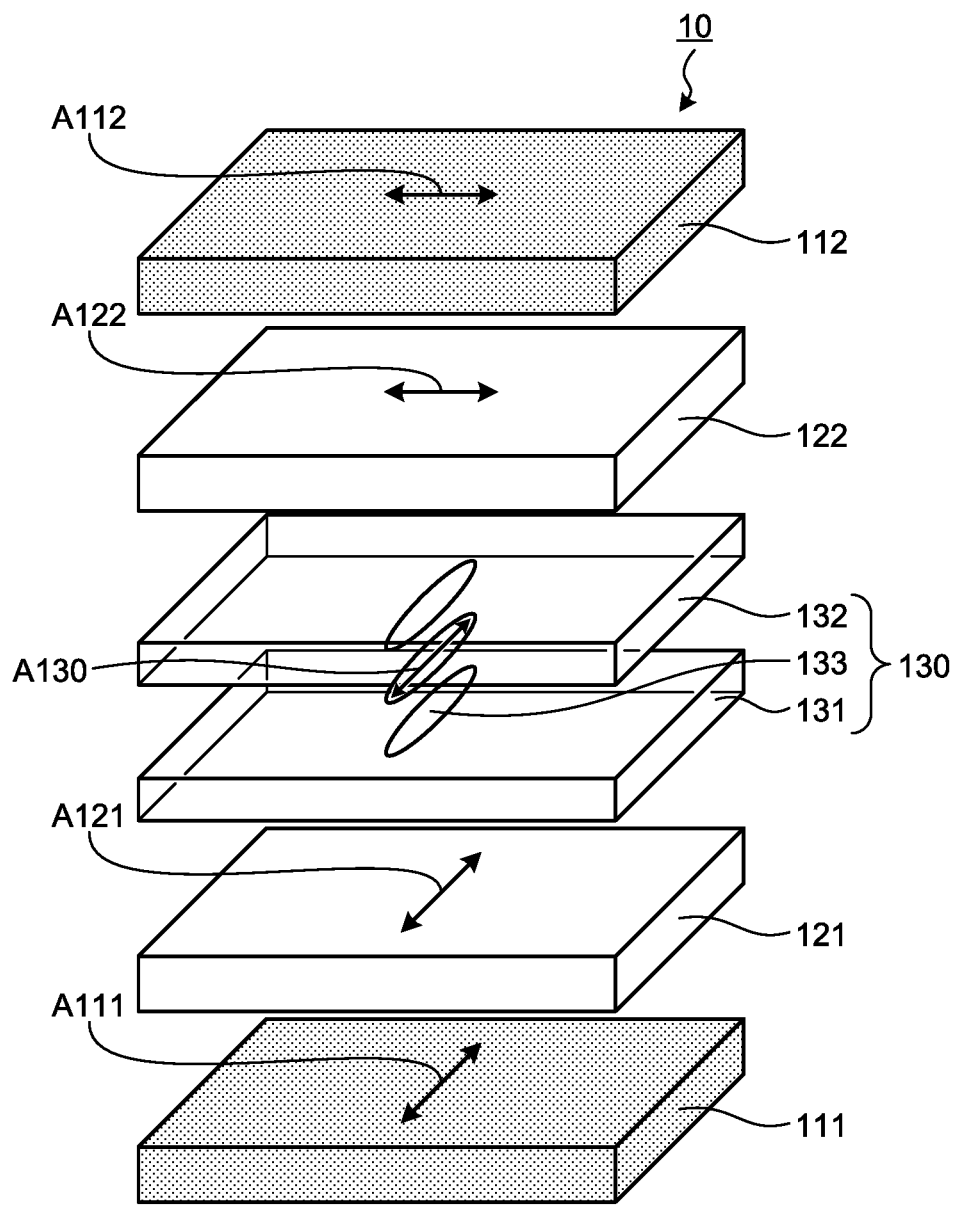
FIG. 1 is an exploded perspective view schematically illustrating an example of a liquid crystal display device according to the present invention.

Hereinafter, the present invention will be described in detail by illustrating embodiments and examples. However, the present invention is not limited to the following embodiments and examples, and may be optionally modified for implementation without departing from the scope of claims of the present invention and its equivalents.

In the following description, the "long-length" film means a film having a length which is at least five times or more, preferably 10 times or more the width. Specifically, the "long-length" film is a film having a length with which the film is wound up in a roll shape for storage or transportation. The upper limit of the ratio of the length relative to the width of the film is not particularly limited, and may be, for example, 100,000 times or less.

In the following description, the in-plane phase difference Re of a film is a value represented by $Re=(n_x-n_y) \times d$, unless otherwise stated. The phase difference Rth in the thickness direction of a film is a value represented by $Rth=\{(n_x+n_y)/2-n_z\} \times d$, unless otherwise stated. Furthermore, the NZ factor of a film is a value represented by $(n_x-n_z)/(n_x-n_y)$, unless otherwise stated. $n_x$ herein represents a refractive index in a direction that, among directions that are perpendicular to the thickness direction of a film (in-plane directions), provides a maximum refractive index. $n_y$ represents a refractive index in a direction that is orthogonal to the direction of $n_x$ among the in-plane directions. $n_z$ represents a refractive index in the thickness direction. d represents the thickness of a film. The measurement wavelength is 590 nm, unless otherwise stated.

In the following description, that the intrinsic birefringence of a material is positive means that, when the material is stretched, the refractive index in the stretching direction becomes larger than the refractive index in a direction orthogonal to the stretching direction, unless otherwise stated. That the intrinsic birefringence value of a material is negative means that, when the material is stretched, the refractive index in the stretching direction becomes smaller than the refractive index in a direction orthogonal to the stretching direction, unless otherwise stated. The value of the intrinsic birefringence may be calculated from a dielectric constant distribution.

In the following description, the front direction of a film means the normal line direction of the main surface of the film, unless otherwise stated. Specifically, the front direction of a film indicates the direction at a polar angle of 0° at an azimuth angle of 0° with respect to the main surface.

In the following description, when the direction of an element is "parallel", "perpendicular", and "orthogonal", it may contain an error within the range that does not impair the effects of the present invention, for example, within the range of ±5°, unless otherwise stated.

1. Liquid Crystal Display Device: Summary

The liquid crystal display device according to the present invention includes a first polarizer, a liquid crystal cell in which the azimuth orientation direction of a liquid crystal substance is altered by an electric field parallel to the display surface, and a second polarizer, which are disposed in this order from the light source side. In such a device, the liquid crystal substance constituting the liquid crystal cell usually has a rod-like molecular structure, and the orientation axis of the liquid crystal substance becomes parallel to the display surface. A specific example of such a liquid crystal cell may be a liquid crystal cell of an IPS (in-plane switching) mode. In the liquid crystal cell of the IPS mode, the amount of light passing through the cell is controlled by the alteration of the direction of the rod-like liquid crystal substance oriented in a direction parallel to the display surface while maintaining such a parallel state. As described herein, the orientation axis of the molecules of the liquid crystal substance means the orientation direction when a black image is displayed, unless otherwise stated.

In the liquid crystal display device according to the present invention, the absorption axis of the first polarizer and the absorption axis of the second polarizer are disposed in directions orthogonal to each other, and the absorption axis of the first polarizer and the orientation axis of the molecules of the liquid crystal substance of the liquid crystal cell are disposed in parallel to each other. About the liquid crystal cell being regarded as the center, the direction on the side of the first polarizer and the direction on the side of the second polarizer may be referred to as a light source side and a viewing side, respectively. As the first polarizer and the second polarizer, a known linear polarizer commonly used in liquid crystal display devices may be used. Details of a material constituting the linear polarizer will be described later.

2. Substrate Layer

The liquid crystal display device according to the present invention includes a first substrate layer between the liquid crystal cell and the first polarizer. In the liquid crystal display device according to the present invention, the first substrate layer has a phase difference, and the in-plane direction of the optical axis of the first substrate layer is parallel to the absorption axis of the first polarizer. The optical axis in an optically anisotropic material herein means a direction along which, upon entering of light, division of the light does not occur.

The liquid crystal display device according to the present invention also includes no substrate layer or a second substrate layer as only one layer, between the liquid crystal cell and the second polarizer. From the viewpoint of protecting the second polarizer by the substrate layer to improve the durability of the second polarizer, it is preferable to include the second substrate layer as only one layer. When the second substrate layer is included, the second substrate layer may take any of the embodiments of the following (1) to (3).

(1) The second substrate layer is a layer having a phase difference, and the in-plane direction of the optical axis of the second substrate layer is parallel to the absorption axis of the second polarizer.

(2) The second substrate layer is a layer having a phase difference, and the in-plane direction of the optical axis of the second substrate layer is perpendicular to the absorption axis of the second polarizer.

(3) The second substrate layer is a layer having no phase difference.

When the liquid crystal display device according to the present invention has no substrate layer or has the second substrate layer as only one layer between the liquid crystal cell and the second polarizer, the liquid crystal display device can be a device of a simple configuration. Furthermore, since the first substrate layer has the aforementioned specific configuration in the liquid crystal display device according to the present invention, coloring when the display surface is observed in an oblique direction can be reduced even with such a simple configuration.

The case where "the liquid crystal display device includes a second substrate layer as only one layer between the liquid crystal cell and the second polarizer" may encompass a case where an optional layer having no independence nor phase difference, in addition to the second substrate layer, also exist between the liquid crystal cell and the second polarizer. For example, a layer for enabling adhesion between components may be disposed between the liquid crystal cell and the second substrate layer, and/or between the second substrate layer and the polarizer. The thickness of such an adhesive layer per layer may be preferably 25 μm or less, and more preferably 10 μm or less. The lower limit of the thickness is not particularly limited, and may be, for example, more than 0 μm. The adhesive agent for forming the adhesive layer encompasses an adhesive agent in a narrow sense (prepared in a liquid state, and solidified during a bonding process), and also encompasses a sticky adhesive agent (having properties of both liquid and solid, and stably maintaining a wet state before and after a bonding process). An example of such a layer may include a sticky adhesive agent "CS9621T" manufactured by Nitto Denko Corporation.

The first substrate layer and the second substrate layer may have a function as a protective film for protecting the polarizer, in addition to optical function. Specifically, both the first substrate layer and the second substrate layer may function as a protective film for the inside of the polarizer (that is, between a pair of polarizers). A protective film may be or may not be disposed on the outside of the polarizer. Since the protective film on the outside does not have an influence on the coloring when the display surface is observed in an oblique direction, any protective film such as a general-purpose TAC (triacetyl cellulose) film may be used.

As to the aforementioned embodiments (1) and (2), it is further preferable that the first substrate layer and the second substrate layer satisfy one of the following requirements (A) and (B).

(A) One or both of the first substrate layer and the second substrate layer are formed of a material having a positive intrinsic birefringence value.

(B) One or both of the first substrate layer and the second substrate layer are formed of a material having a negative intrinsic birefringence value.

When one or both of the first substrate layer and the second substrate layer are formed of a material having a positive intrinsic birefringence value, the NZ factor of such a substrate layer preferably falls within the range of 0.9 to 1.5, and more preferably within the range of 0.95 to 1.2. On the other hand, when one or both of the first substrate layer and the second substrate layer are formed of a material having a negative intrinsic birefringence value, the NZ factor of such a substrate layer preferably falls within the range of −0.5 to 0.1, and more preferably within the range of −0.2 to 0.05.

When one or both of the first substrate layer and the second substrate layer are formed of a material having a positive intrinsic birefringence value, the Re of such a substrate layer falls within the range of preferably 0 nm to 280 nm, and more preferably 0 nm to 140 nm. On the other hand, when one or both of the first substrate layer and the second substrate layer are formed of a material having a negative intrinsic birefringence value, the Re of such a substrate layer falls within the range of preferably 0 nm to 140 nm, and more preferably 0 nm to 70 nm. When these numerical values fall within the aforementioned ranges, coloring when the display surface is observed in an oblique direction can be particularly favorably reduced.

When the substrate layer is formed of a material having a positive intrinsic birefringence value, the in-plane direction of the optical axis coincides with the slow axis in the in-plane direction. When the substrate layer is formed of a material having a negative intrinsic birefringence value, the in-plane direction of the optical axis coincides with the fast axis in the in-plane direction.

In the embodiment (3), the second substrate layer is a layer having no phase difference. As described herein, that a layer "has no phase difference" means that the Re and Rth of the layer are values falling within specific ranges which are close to 0. That is, it means the cases wherein Re falls within the range of 0 to 5 nm, and Rth falls within the range of −10 nm to 10 nm. Such a substrate layer having no phase difference is also called a "zero phase difference film". The zero phase difference film is advantageous in reducing the coloring when the display surface is observed in an oblique direction. On the other hand, production of the zero phase difference film requires selection of the material and production process for achieving reduction of the phase difference expression. Therefore, it is difficult to perform inexpensive, efficient production of such a film. According to the present invention, the coloring when the display surface is observed in an oblique direction can be reduced without using such a zero phase difference film in the first substrate layer. Although the second substrate layer may include the zero phase difference film as in the embodiment (3) to thereby achieve still further favorable reduction of coloring, favorable effects of the present invention can be obtained even when a layer having a phase difference is used as in the embodiments (1) and (2).

In the embodiment (3), the Re of the first substrate layer falls within the range of preferably 0 nm to 3 nm, and more preferably 0 nm to 1 nm, and the Rth of the first substrate layer falls within the range of preferably 0 nm to 7 nm, and more preferably 0 nm to 5 nm. When the values of Re and Rth fall within the aforementioned ranges, coloring when the display surface is observed in an oblique direction can be particularly favorably reduced.

3. Embodiments (1) to (3)

The aforementioned embodiments (1) to (3) will be described with reference to the drawings one by one.

FIG. 1 is an exploded perspective view schematically illustrating an example of the liquid crystal display device according to the present invention. This example corresponds to the aforementioned embodiment (1). In FIG. 1, a liquid crystal display device 10 is illustrated in such a state that it is horizontally placed with the light source side directed downward and the viewing side directed upward, and the respective constituents are exploded. The liquid crystal display device 10 includes a first polarizer 111, a first substrate layer 121, a liquid crystal cell 130, a second substrate layer 122, and a second polarizer 112 in this order from the light source side.

In the liquid crystal cell 130, a void space for the cell is defined by a light source-side substrate 131, a viewing-side substrate 132, and other constituents (not shown). A liquid crystal substance 133 is filled in such a void space to thereby constitute an IPS liquid crystal cell. The liquid crystal cell 130 is configured such that the azimuth orientation direction of the liquid crystal substance is altered by an electric field parallel to the display surface. The liquid crystal substance 133 of the liquid crystal cell 130 has a rod-like molecular structure. The orientation axis of the rod-like molecular structure is defined as the major axis direction of the molecules. The orientation axis of the liquid crystal substance 133 becomes in a direction parallel to the display surface, and becomes in a direction indicated by arrow A130 when a black image is displayed.

In the liquid crystal display device 10, an absorption axis A111 of the first polarizer 111 and an absorption axis A112 of the second polarizer 112 are disposed in directions orthogonal to each other. In the liquid crystal display device 10, the absorption axis A111 of the first polarizer 111 and an orientation axis A130 of the molecules of the liquid crystal substance 133 of the liquid crystal cell 130 are disposed in parallel to each other. Furthermore, in the liquid crystal display device 10, an in-plane direction A121 of the optical axis of the first substrate layer 121 is parallel to the absorption axis A111 of the first polarizer 111, and an in-plane direction A122 of the optical axis of the second substrate layer 122 is parallel to the absorption axis A112 of the second polarizer 112. Accordingly, the in-plane direction A121 of the optical axis of the first substrate layer 121 and the in-plane direction A121 of the optical axis of the second substrate layer 122 are disposed in directions orthogonal to each other.

In the operation of the liquid crystal display device 10, light from a light source (not shown) enters the first polarizer 111 from the bottom side of the drawing. A linearly polarized component of such incident light passes through the first polarizer 111, and further passes through the first substrate layer 121, the liquid crystal cell 130, and the second substrate layer 122 to reach the second polarizer 112. When a black image is displayed, ideally all of the light having reached the second polarizer 112 does not pass through the second polarizer 112, so that the black image display is achieved. On the other hand, when the state of an electric field in the liquid crystal cell 130 is altered such that the orientation axis of the molecules of the liquid crystal substance is altered from the direction indicated by A130, the polarization state of the light passing through the liquid crystal cell 130 is altered. Accordingly, a part or an entirety of the light having reached the second polarizer 112 can pass through the second polarizer 112, thereby achieving a display other than a black image display.

When a black image is displayed on the liquid crystal display device 10, the absorption axis A111 of the first polarizer 111, the in-plane direction A121 of the optical axis of the first substrate layer 121, and the orientation axis A130 of the molecules of the liquid crystal substance 133 of the liquid crystal cell 130 are disposed in parallel to one another. Accordingly, polarized light exiting the first polarizer 111, which passes through in a direction perpendicular or oblique to the display surface, passes through the second substrate layer 122 and the liquid crystal cell 130 without significant disturbance of the polarization state. However, since the in-plane direction A122 of the optical axis of the second substrate layer 122 is perpendicular to these, disturbance of the polarization state (alteration of the polarization direction of linearly polarized light, alteration from linearly polarized light to elliptically polarized light, or the like) can occur particularly in the light passing through in an oblique direction. It is predicted that such disturbance of the polarization state causes coloring when display surface with black image is observed in an oblique direction. However, the present inventor found that in such a case, the divergence between the polarization state after the polarization state of light on the long wavelength side has been disturbed and the polarization state absorbed along the absorption axis A112 of the second polarizer 112 is approximately at the same level as the divergence between the polarization state after the polarization state of light on the short wavelength side has been disturbed and the polarization state absorbed along the absorption axis A112 of the second polarizer 112. As a result, actually observed coloring can be suppressed such that it is not much more significant compared to the coloring when the zero phase difference film is used as upper and lower substrate layers.

Furthermore, in the liquid crystal display device 10, the in-plane direction A121 of the optical axis of the first substrate layer 121 is parallel to the absorption axis A111 of the first polarizer 111. Therefore, a layered body including the first substrate layer 121 and the first polarizer 111 with such a directional relationship between them precisely positioned can be produced in a simple method such as co-stretching. A layered body including the second substrate layer 122 and the second polarizer 112 in which the directional relationship between the absorption axis and the optical axis of them is precisely positioned can also be similarly produced in a simple method. In addition, with the liquid crystal display device 10, coloring when the display surface is observed in an oblique direction can be reduced as previously described. Therefore, the liquid crystal display device 10 can be a liquid crystal display device which can be produced in an inexpensive and efficient manner while having favorable display quality.

Figure 2:
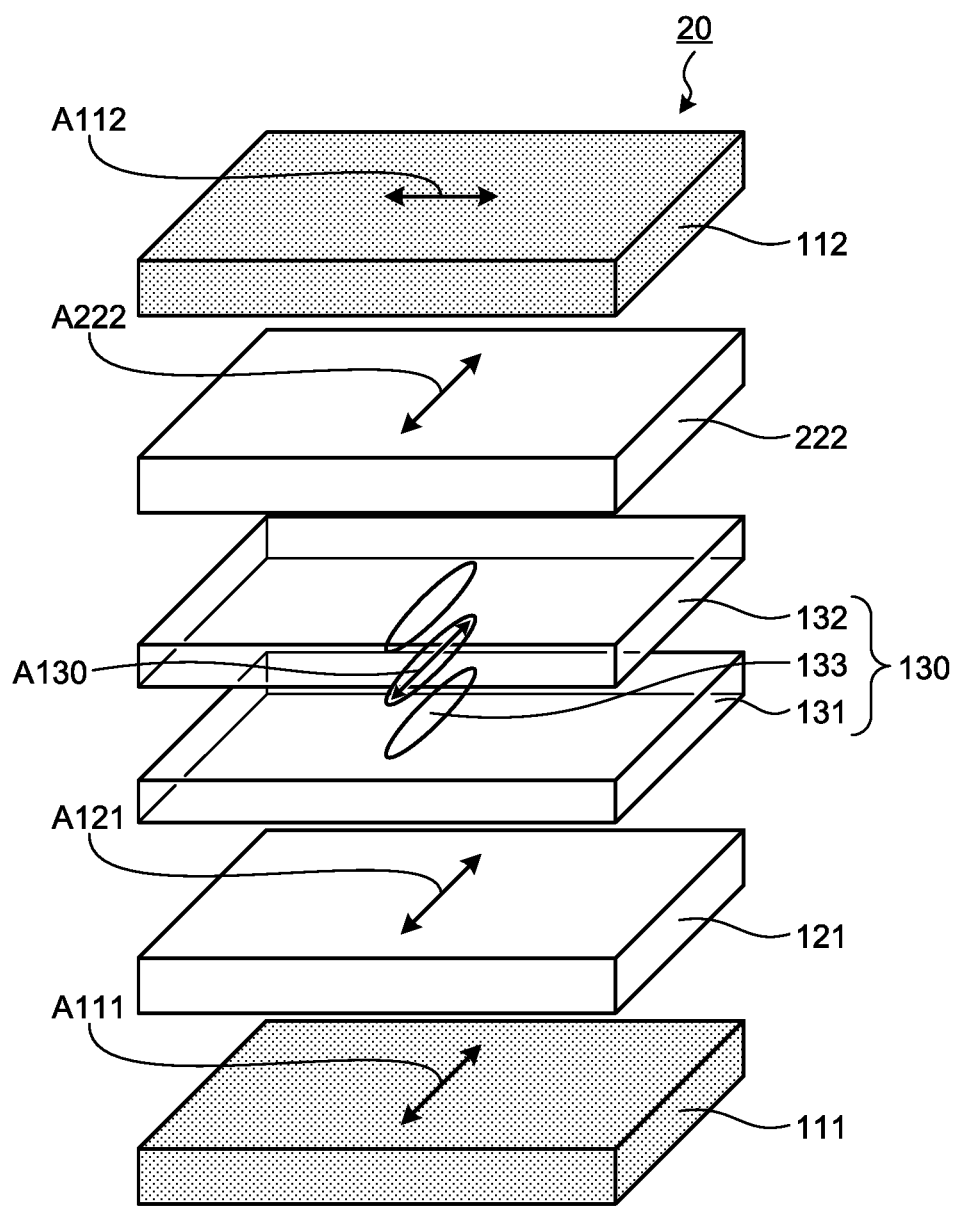
FIG. 2 is an exploded perspective view schematically illustrating another example of the liquid crystal display device according to the present invention.

FIG. 2 is an exploded perspective view schematically illustrating another example of the liquid crystal display device according to the present invention. This example corresponds to the aforementioned embodiment (2). In FIG. 2, a liquid crystal display device 20 is different from the liquid crystal display device 10 in FIG. 1 in that it has a second substrate layer 222 in place of the second substrate layer 122, while other features are in common. The second substrate layer 222 is different from the second substrate layer 122 of the liquid crystal display device 10 in that an in-plane direction A222 of the optical axis of the second substrate layer 222 is perpendicular to the absorption axis A112 of the second polarizer 112.

When a black image is displayed on the liquid crystal display device 20, all of the absorption axis A111 of the first polarizer 111, the in-plane direction A121 of the optical axis of the first substrate layer 121, the orientation axis A130 of the molecules of the liquid crystal substance 133 of the liquid crystal cell 130, and the absorption axis A222 of the second polarizer 222 are disposed in parallel to one another. In this respect, the liquid crystal display device 20 has an advantageous configuration for delivering polarized light exiting the first polarizer 111 and proceeding in a perpendicular or oblique direction to the second polarizer 112 without disturbance of the polarization state. However, an ordinary color display liquid crystal cell includes a color filter in the liquid crystal cell, and the color filter often has negative C optical anisotropy (the refractive indices nx, ny, and nz of the layer satisfy nx>nz and ny>nz, and the in-plane retardation Re has a value that is as small as 0 nm≤Re≤5 nm). Linearly polarized light entering such a liquid crystal cell 130 exits as an elliptically polarized light slightly having circular polarization properties, and such circular polarization properties are altered in the second polarizer 222. As a result, linear polarization properties come to be somewhat disturbed. This disturbance of linear polarization properties particularly becomes large when the phase difference of the second polarizer 222 is large. However, since the degree of the disturbance is usually low, the coloring when the display surface is observed in an oblique direction can be low by the effect by the parallel disposal of the absorption axis A111, the in-plane direction A121 of the optical axis, the orientation axis A130, and the absorption axis A222.

In regard to the liquid crystal display device 20, although it is difficult to produce the second substrate layer 222 and the second polarizer 112 by co-stretching, it is easy to produce the first substrate layer 121 and the first polarizer 111 by co-stretching. Therefore, the liquid crystal display device 20 can be produced in an inexpensive and efficient manner in that respect, and can also be a liquid crystal display device having a favorable display quality.

Figure 3:
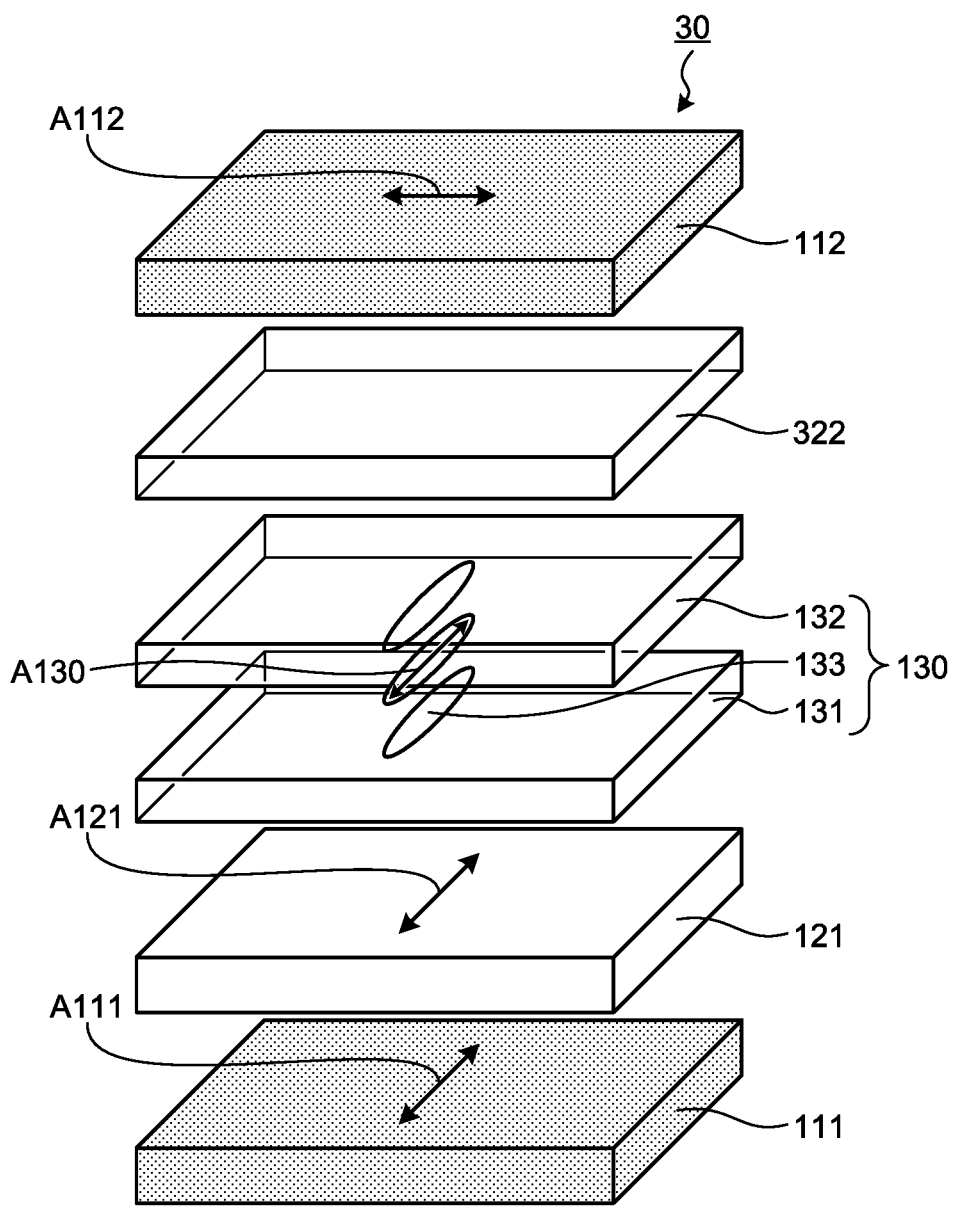
FIG. 3 is an exploded perspective view schematically illustrating still another example of the liquid crystal display device according to the present invention.

FIG. 3 is an exploded perspective view schematically illustrating still another example of the liquid crystal display device according to the present invention. This example corresponds to the aforementioned embodiment (3). In FIG. 3, a liquid crystal display device 30 is different from the liquid crystal display device 10 in FIG. 1 in that it has a second substrate layer 322 as a zero phase difference film in place of the second substrate layer 122, while other features are in common.

The liquid crystal display device 30 employs a zero phase difference film as the second substrate layer 322. Accordingly, the liquid crystal display device 30 has a configuration that is more advantageous than the liquid crystal display device 30 in FIG. 2, for delivering polarized light exiting the first polarizer 111 and proceeding in a perpendicular or oblique direction to the second polarizer 112 without disturbance of the polarization state.

In regard to the liquid crystal display device 30, not only it is difficult to produce the second substrate layer 322 and the second polarizer 112 by co-stretching, but also it is necessary to select a material and production process which reduce the expression of the phase difference in producing the second substrate layer 322. Therefore, it is difficult of achieve inexpensive and efficient production. Nonetheless, the first substrate layer 121 and the first polarizer 111 can be easily produced by co-stretching. Therefore, the liquid crystal display device 30 can be a liquid crystal display device which has favorable display quality and can also be produced in an inexpensive and efficient manner compared to, for example, when the first substrate layer and the second substrate layer are both a zero phase difference film.

4. Materials of and Methods for Producing Substrate Layer and Polarizer

The liquid crystal display device according to the present invention may be produced by: preparing the aforementioned polarizing plate which includes a specific substrate layer and a polarizer, and further optionally includes a protective film on the outside of the polarizer; and combining the prepared polarizing plate with known components, such as an IPS liquid crystal cell, which constitute the rest of the liquid crystal display device. Therefore, in the following, the materials of and methods for producing the substrate layer and the polarizer which constitute the liquid crystal display device according to the present invention will be described.

As the material constituting the substrate layer, any desired material may be appropriately selected from known materials for a phase difference film and a polarizer protective film. From the viewpoint of obtaining properties such as desired phase difference, light permeability, and strength, the material used as a material of a phase difference film may be preferably used.

When a material having a positive intrinsic birefringence value is used as the material of the substrate layer, an example of such a material may include a resin containing a polymer having a positive intrinsic birefringence value. Examples of such a polymer may include polyolefin such as polyethylene and polypropylene; polyester such as polyethylene terephthalate and polybutylene terephthalate; polyarylene sulfide such as polyphenylene sulfide; polyvinyl alcohol; polycarbonate; polyarylate; a cellulose ester polymer, polyether sulfone; polysulfone; polyallyl sulfone; polyvinyl chloride; a cyclic olefin polymer such as a norbornene polymer; and a rod-like liquid crystal polymer. As the polymer, one type thereof may be solely used, and two or more types thereof may also be used in combination at any ratio. The polymer may be either a homopolymer or a copolymer. Among these, a cyclic olefin polymer is preferable, because it is excellent in mechanical properties, heat resistance, transparency, low hygroscopicity, size stability, and lightweight properties.

The cyclic olefin polymer is a polymer including a structural unit having an alicyclic structure. The cyclic olefin polymer may be a polymer having an alicyclic structure on the main chain, a polymer having an alicyclic structure on the side chain, a polymer having an alicyclic structure on the main chain and the side chain, and a mixture of two or more thereof at any ratio. Among these, a polymer having an alicyclic structure on the main chain is preferable, from the viewpoint of mechanical strength and heat resistance.

Examples of the alicyclic structure may include a saturated alicyclic hydrocarbon (cycloalkane) structure and an unsaturated alicyclic hydrocarbon (cycloalkene, cycloalkine) structure. Among these, from the viewpoint of mechanical strength and heat resistance, a cycloalkane structure and a cycloalkene structure are preferable, and a cycloalkane structure is particularly preferable.

The number of carbon atoms constituting the alicyclic structure per one alicyclic structure is preferably 4 or more, and more preferably 5 or more, and is preferably 30 or less, more preferably 20 or less, and particularly preferably 15 or less. When the number of carbon atoms constituting the alicyclic structure falls within this range, mechanical strength, heat resistance, and molding properties of the substrate layer can be highly balanced.

The ratio of the structural unit having an alicyclic structure in the cyclic olefin polymer is preferably 55% by weight or more, further preferably 70% by weight or more, and particularly preferably 90% by weight or more. When the ratio of the structural unit having an alicyclic structure in the cyclic olefin polymer falls within this range, the substrate layer can have favorable transparency and heat resistance.

Among the cyclic olefin polymers, a cycloolefin polymer is preferable. The cycloolefin polymer is a polymer having a structure obtained by polymerizing a cycloolefin monomer. The cycloolefin monomer is a compound which has a cyclic structure formed with carbon atoms and which has a polymerizable carbon-carbon double bond in the cyclic structure. An example of the polymerizable carbon-carbon double bond may be a carbon-carbon double bond which enables polymerization such as ring-opening polymerization. Examples of the cyclic structure of the cycloolefin monomer may include monocyclic, polycyclic, fused polycyclic, bridged cyclic, and polycyclic including a combination thereof. Among these, a polycyclic cycloolefin monomer is preferable from the viewpoint of highly balancing the properties of the resulting polymer.

Among the aforementioned cycloolefin polymers, preferable examples thereof may include a norbornene-based polymer, a monocyclic cyclic olefin-based polymer, a cyclic conjugated diene-based polymer, and hydrogenated products thereof. Among these, a norbornene-based polymer is particularly suitable, because it is favorable in terms of molding properties.

Examples of the norbornene-based polymer may include a ring-opening polymer of a monomer having a norbornene structure, and a hydrogenated product thereof; and an addition polymer of a monomer having a norbornene structure, and a hydrogenated product thereof. Examples of the ring-opening polymer of a monomer having a norbornene structure may include a ring-opening homopolymer of one type of monomer having a norbornene structure, a ring-opening copolymer of two or more types of monomers having a norbornene structure, and a ring-opening copolymer of a monomer having a norbornene structure and another monomer which is copolymerizable with the monomer having a norbornene structure. Furthermore, examples of the addition polymer of a monomer having a norbornene structure may include an addition homopolymer of one type of monomer having a norbornene structure, an addition copolymer of two or more types of monomers having a norbornene structure, and an addition copolymer of a monomer having a norbornene structure and another monomer which is copolymerizable with the monomer having a norbornene structure. Among these, a hydrogenated product of the ring-opening polymer of a monomer having a norbornene structure is particularly suitable, from the viewpoint of molding properties, heat resistance, low hygroscopicity, size stability, lightweight properties, and the like.

Examples of the monomer having a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$]deca-3-ene (common name: methanotetrahydrofluorene), tetracyclo[4.4.0.1$^{2,5}$.1$^{7,10}$]dodeca-3-ene (common name: tetracyclododecene), and derivatives of these compounds (for example, a derivative having a substituent on the ring). Examples of the substituent herein may include an alkyl group, an alkylene group, and a polar group. A plurality of the substituents being the same as or different from each other may be bonded on the ring. As the monomer having a norbornene structure, one type thereof may be solely used, and two or more types thereof may also be used in combination at any ratio.

Examples of the polar group may include a hetero atom, and an atomic group having a hetero atom. Examples of the hetero atom may include an oxygen atom, a nitrogen atom, a sulfur atom, a silicon atom, and a halogen atom. Specific examples of the polar group may include a carboxyl group, a carbonyloxycarbonyl group, an epoxy group, a hydroxyl group, an oxy group, an ester group, a silanol group, a silyl group, an amino group, an amido group, an imido group, a nitrile group, and a sulfonic acid group.

Examples of the monomer which is ring-opening copolymerizable with the monomer having a norbornene structure may include monocyclic olefins such as cyclohexene, cycloheptene, cyclooctene, and derivatives thereof; and cyclic conjugated diene such as cyclohexadiene, cycloheptadiene, and derivatives thereof. As the monomer that is ring-opening copolymerizable with the monomer having a norbornene structure, one type thereof may be solely used, and two or more types thereof may also be used in combination at any ratio.

The ring-opening polymer of a monomer having a norbornene structure may be produced by, for example, polymerizing or copolymerizing monomers in the presence of a ring-opening polymerization catalyst.

Examples of the monomer which is addition copolymerizable with the monomer having a norbornene structure may include α-olefin of 2 to 20 carbon atoms such as ethylene, propylene, and 1-butene, and derivatives thereof; cycloolefin such as cyclobutene, cyclopentene, and cyclohexene, and derivatives thereof; and non-conjugated diene such as 1,4-hexadiene, 4-methyl-1,4-hexadiene, and 5-methyl-1,4-hexadiene. Among these, α-olefin is preferable, and ethylene is more preferable. As the monomer that is addition copolymerizable with the monomer having a norbornene structure, one type thereof may be solely used, and two or more types thereof may also be used in combination at any ratio.

The addition polymer of a monomer having a norbornene structure may be produced by, for example, polymerizing or copolymerizing monomers in the presence of an addition polymerization catalyst.

The hydrogenated products of the aforementioned ring-opening polymers and addition polymers may be produced by, for example, hydrogenating preferably 90% or more of unsaturated carbon-carbon bonds in a solution of any of these ring-opening polymers and addition polymers, in the presence of a hydrogenation catalyst containing transition metal such as nickel or palladium.

A preferable norbornene-based polymer, among the norbornene-based polymers, is a norbornene-based polymer including, as a structural unit, X: a bicyclo[3.3.0]octane-2,4-diyl-ethylene structure, and Y: a tricyclo[4.3.0.1$^{2,5}$]decane-7,9-diyl-ethylene structure, in which the amount of these structural units is 90% by weight or more relative to all structural units of the norbornene-based polymer, and the ratio between X and Y is 100:0 to 40:60 in terms of the weight ratio of X:Y. With the use of such a polymer, there can be obtained a substrate layer containing the norbornene-based polymer in which size change in a long period of time does not occur, and the stability of optical properties is excellent.

Examples of the monocyclic cyclic olefin-based polymers may include an addition polymer of a cyclic olefin-based monomer having a single ring such as cyclohexene, cycloheptene, and cyclooctene.

Examples of the cyclic conjugated diene-based polymers may include a polymer obtained by a cyclization reaction of an addition polymer of a conjugated diene-based monomer such as 1,3-butadiene, isoprene, and chloroprene; a 1,2- or 1,4-addition polymer of a cyclic conjugated diene-based monomer such as cyclopentadiene and cyclohexadiene; and hydrogenated products thereof.

When a material having a negative intrinsic birefringence value is used as the material of the substrate layer, an example of such a material may include a resin containing a polymer having a negative intrinsic birefringence value. Examples of such a polymer may include a styrene-based polymer, a polyacrylonitrile polymer, a polymethyl methacrylate polymer, and a multicomponent copolymer thereof. The styrene-based polymer is a polymer having a styrene unit structure as a part or all of repeating units. Examples of such a styrene-based polymer may include: polystyrene; and a copolymer between a styrene-based monomer such as styrene, α-methylstyrene, o-methylstyrene, p-methylstyrene, p-chlorostyrene, p-nitrostyrene, p-aminostyrene, p-carboxystyrene, and p-phenyl styrene, and another monomer such as ethylene, propylene, butadiene, isoprene, acrylonitrile, methacrylonitrile, α-chloroacrylonitrile, N-phenylmaleimide, methyl acrylate, methyl methacrylate, ethyl acrylate, ethyl methacrylate, acrylic acid, methacrylic acid, maleic anhydride, and vinyl acetate. Among these, a styrene-based polymer is preferable, from the viewpoint of high phase difference expression properties. In particular, polystyrene, a copolymer of styrene and N-phenylmaleimide, or a copolymer of styrene and maleic anhydride is particularly preferable.

As the polymer, one type thereof may be solely used, and two or more types thereof may also be used in combination at any ratio.

The weight-average molecular weight (Mw) of the polymers constituting the material of the substrate layer is preferably 10,000 or more, more preferably 15,000 or more, and particularly preferably 20,000 or more, and is preferably 100,000 or less, more preferably 80,000 or less, and particularly preferably 50,000 or less. When the weight-average molecular weight falls within such a range, mechanical strength and molding processability of the substrate layer can be highly balanced in a suitable manner. The aforementioned weight-average molecular weight herein is a polyisoprene- or polystyrene-equivalent weight-average molecular weight measured by gel permeation chromatography with cyclohexane as a solvent (however, when a sample is not dissolved in cyclohexane, toluene may be used).

The molecular weight distribution (weight-average molecular weight (Mw)/number-average molecular weight (Mn)) of the polymer constituting the material of the substrate layer is preferably 1.2 or more, more preferably 1.5 or more, and particularly preferably 1.8 or more, and is preferably 3.5 or less, more preferably 3.0 or less, and particularly preferably 2.7 or less. When the molecular weight distribution is equal to or more than the lower limit value of the aforementioned range, productivity of the polymers can be enhanced, and production costs can thereby be reduced. When the molecular weight distribution is equal to or less than the upper limit value, the amount of a low-molecular component is reduced, whereby relaxation during exposure to high temperature can be suppressed and stability of the substrate layer can be enhanced.

The ratio of the polymers constituting the material of the substrate layer is preferably 50% by weight to 100% by weight, more preferably 70% by weight to 100% by weight, and particularly preferably 90% by weight to 100% by weight. When the ratio of the polymer falls within the aforementioned range, the substrate layer can have sufficient heat resistance and transparency.

The resin constituting the material of the substrate layer may contain a compounding agent in addition to the aforementioned polymers. Examples of the compounding agent may include a coloring agent such as a pigment and a dye; a plasticizer; a fluorescent brightener; a dispersant; a thermal stabilizer; a light stabilizer; a UV absorber; an antistatic agent; an antioxidant; a fine particle; and a surfactant. As the component, one type thereof may be solely used, and two or more types thereof may also be used in combination at any ratio.

The glass transition temperature Tg of the resin constituting the material of the substrate layer is preferably 100° C. or higher, more preferably 110° C. or higher, and particularly preferably 120° C. or higher, and is preferably 190° C. or lower, more preferably 180° C. or lower, and particularly preferably 170° C. or lower. When the glass transition temperature of the resin constituting the substrate layer is equal to or more than the lower limit value of the aforementioned range, durability of the substrate layer under a high temperature environment can be enhanced. When the glass transition temperature is equal to or less than the upper limit value, the stretching process can be easily performed.

By stretching a pre-stretch film formed of the aforementioned material, there can be obtained the substrate layer having a desired phase difference. As the stretching method, any appropriate method may be adopted according to the optical characteristics which are desired to be expressed by stretching. For example, uniaxial or biaxial stretching may be performed by performing stretching once or more by a method such as: a method of uniaxially stretching in a lengthwise direction utilizing a difference in peripheral speed between rolls (longitudinal uniaxial stretching); a method of uniaxially stretching in a width direction using a tenter stretching machine (transverse uniaxial stretching); and a method of stretching a film in an oblique direction (oblique stretching).

When the substrate layer is provided to the liquid crystal display device, thickness of the substrate layer can be appropriately adjusted within the range which achieves desired physical properties and optical properties. For example, the thickness of the substrate layer may be preferably more than 0 μm and 40 μm or less, and more preferably more than 0 μm and 30 μm or less.

As the polarizer, there may be used, for example, a polarizer obtained by subjecting a film of an appropriate hydrophilic polymer such as polyvinyl alcohol or partially formalized polyvinyl alcohol to a dyeing treatment with a dichroic substance such as iodine and dichroic dye and a stretching treatment, and further subjecting the film to appropriate treatments such as a crosslinking treatment as necessary in an appropriate order and technique. In such a production method, an absorption axis may be usually expressed in the stretching direction in the stretching treatment. The thickness of the polarizer layer is generally 5 μm to 80 μm, although not limited thereto.

The substrate layer and the polarizer may be used as a layered body in which they are bonded, in the production of the liquid crystal display device. Accordingly, the substrate layer may also function as a protective film on the inside of the polarizer, and the entire layered body may be used as a polarizing plate.

The production of the substrate layer and the production of the polarizer may be separately performed, and thereafter they may be bonded to obtain a polarizing plate. However, since both the production of the substrate layer and the production of the polarizer may include a stretching process, they may be produced by co-stretching to obtain a polarizing plate in which they are laminated. That is, by stretching a pre-stretch layered body including a hydrophilic polymer layer and a pre-stretch film to obtain a stretched layered body, and further subjecting the hydrophilic polymer to a dyeing treatment before or after the stretching, there can be easily produced a polarizing plate in which the substrate layer and the polarizer are laminated, and the optical axis and absorption axis of these are aligned. Such a polarizing plate may be used as the first polarizer and the first substrate layer in the liquid crystal display device according to the present invention. In the aforementioned embodiment (1), the polarizing plate may also be used as the second polarizer and the second substrate layer.

EXAMPLES

Hereinafter, the present invention will be specifically described by referring to Examples. However, the present invention is not limited to the following Examples. The present invention may be optionally modified for implementation without departing from the scope of claims of the present invention and its equivalents.

Unless otherwise stated, "%" and "parts" indicating quantity in the following description are on the basis of weight. Unless otherwise stated, the following operations were performed under the conditions of normal temperature and normal pressure.

[Evaluation Methods]

(Method for Measuring Phase Difference and NZ Factor)

Using a phase difference meter ("KOBRA-21ADH" manufactured by Oji Scientific Instruments, Co., Ltd.), the in-plane phase difference and the phase difference in the thickness direction were measured at a plurality of points spaced apart at an interval of 50 mm in the width direction of a film. Average values for the values measured at these points were calculated. The average values were adopted as the in-plane phase difference and the phase difference in the thickness direction of the film. At this time, the measurement was performed at a wavelength of 590 nm. The NZ factor was calculated from the obtained in-plane phase difference and phase difference in the thickness direction.

(Method for Evaluating Liquid Crystal Display Device by Visual Observation)

The liquid crystal display devices obtained in Examples and Comparative Examples were placed in a darkroom which shields the interior thereof form outside light. Black image is displayed on the display screen, and visual observation was performed. The observation was performed at all azimuth directions in an azimuth angle of 0° to 360° from tilt directions at a polar angle of 60°, and the amount of the difference in hue depending on the azimuth angles was evaluated.

Each of 20 observers observed the liquid crystal display devices of all Examples and Comparative Examples. Each observer ranked the results of all Examples and Comparative Examples, and assigned scores corresponding to the ranks (10 points for the best, 9 points for the second best, . . . 1 point for the worst). For each of Examples and Comparative Examples, the sum total of the scores by all observers was calculated, and the obtained total was adopted as the score for each of Examples and Comparative Examples. The difference between the highest score and the lowest score among the scores assigned to Examples and Comparative Examples was calculated. The difference was equally divided into five ranges. The five ranges were consecutively defined from the best as ranges A to E. The score of each of Examples and Comparative Examples was evaluated to determine the range to which it belongs.

(Method for Calculating Reflectivity by Simulation)

Using "LCD Master" manufactured by Shintec, Inc. as a simulation software, a liquid crystal display device including the polarizing plate produced in each of Examples and Comparative Examples and having a structure schematically illustrated in any one of FIG. 1 to FIG. 3 was modeled. Then, evaluation by simulation for chroma C* was performed.

A structure was set up as the simulation model, wherein the structure consists of: a liquid crystal cell in which a liquid crystal compound is oriented in parallel to the surface of a substrate; a color filter having a phase difference; and a pair of polarizing plates disposed on the outsides of the liquid crystal cell and the color filter. In such a structure, the direction of the absorption axis of the polarizer as well as the thickness, Re, Rth, NZ factor, and direction of the slow axis of the substrate layer were set up as in each of Examples and Comparative Examples. The settings of the liquid crystal cell and the color filter were made in accordance with the actually measured values from a commercially available liquid crystal display device equipped with an IPS panel (iPad (registered trademark) 2 manufactured by Apple Inc.) used in Examples and Comparative Examples. Furthermore, the setting of the liquid crystal cell was in a black state, presuming a mode in which black image is displayed during no application of voltage, that is, a normally black mode.

In this model, there was calculated a spectrum of the transmission light which passes to the second polarizing plate when an irradiation is performed on the first polarizing plate with an LED light source. The setting of the LED light source was made in accordance with the actually measured value of the LED light source of the aforementioned liquid crystal display device. The spectrum of the transmission light was calculated every 5° in the azimuth angle direction within the azimuth angle range of 0° to 360° at a polar angle of 60°. The average value of the chroma C* calculated from the calculated transmission light spectra was adopted as the chroma at a polar angle of 60°.

Example 1

(1-1. Production of Polarizer)

A long-length pre-stretch film made of a polyvinyl alcohol resin, which had been dyed with iodine, was prepared. This pre-stretch film was stretched in the lengthwise direction which formed an angle of 90° with respect to the width direction of the pre-stretch film. Thus, a long-length film of a polarizer was obtained. This polarizer had its absorption axis in the lengthwise direction of the polarizer, and its transmission axis in the width direction of the polarizer.

(1-2. Production of Substrate Layer (First and Second))

Into a reaction vessel in which the inside air was substituted with nitrogen, 7 parts (1% by weight with respect to the total amount of monomers used for polymerization) of a mixture of tricyclo[4.3.0.1$^{2,5}$]deca-3-ene (herein, referred to as "DCP"), tetracyclo[4.4.0.1$^{2,5}$.1$^{7,10}$]dodeca-3-ene (herein, referred to as "TCD"), and tetracyclo[9.2.1.0$^{2,10}$0$^{3,8}$]tetradeca-3,5,7,12-tetraene (herein, referred to as "MTF") (DCP/TCD/MTF=55/40/5, weight ratio), and 1600 parts of cyclohexane were poured. Into the reaction vessel, there were further added 0.55 parts of tri-i-butyl aluminum, 0.21 parts of isobutyl alcohol, 0.84 parts of diisopropyl ether as a reaction adjuster, and 3.24 parts of 1-hexene as a molecular weight adjuster. To the obtained mixture, there was added 24.1 parts of a 0.65% tungsten hexachloride solution dissolved in cyclohexane. Then, the mixture was stirred at 55° C. for 10 minutes. Subsequently, 693 parts of the mixture of DCP, TCD, and MTF (DCP/TCD/MTF=55/40/5, weight ratio) and 48.9 parts of a 0.65% tungsten hexachloride solution dissolved in cyclohexane were each added dropwise into the reaction system continuously over 150 minutes while the reaction system was maintained at 55° C. Thereafter, the reaction of the system was continued for 30 minutes, and then the polymerization was terminated. Accordingly, a ring-opening polymerization reaction liquid containing a ring-opening polymer in cyclohexane was obtained. The polymerization conversion ratio of monomers measured by gas chromatography after the termination of the polymerization was 100%.

The obtained ring-opening polymerization reaction liquid was transferred into a pressure-resistant hydrogenation reaction vessel, and 1.4 parts of a diatomaceous earth-supported nickel catalyst (manufactured by Nikki Chemical Co., Ltd., product name "T8400RL", nickel supporting ratio 57%) and 167 parts of cyclohexane were added. The mixture was reacted at 180° C. for 6 hours under a hydrogen pressure of 4.6 MPa. Through this hydrogenation reaction, a reaction solution containing the hydrogenated product of the ring-opening polymer was obtained. This reaction solution was filtered (manufactured by IHI Corporation, product name "Fundabac Filter") under a pressure of 0.25 MPa with Radiolite #500 as a filtration bed to remove the hydrogenation catalyst. Thus, a colorless, transparent solution was obtained.

Subsequently, per 100 parts of the hydrogenated product, 0.5 part of an antioxidant (pentaerythritoltetrakis[3-(3,5-di-t-butyl-4-hydroxyphenyl)propionate], manufactured by Ciba Specialty Chemicals Inc., product name "Irganox 1010") was added to and dissolved in the obtained solution. Subsequently, the resultant product was consecutively filtered through a Zeta Plus filter 30H (manufactured by Cuno Filter Inc., pore diameter 0.5 μm to 1 μm), and further filtered through another metal fiber filter (manufactured by Nichidai Corporation, pore diameter 0.4 μm) to remove minute solid content. The hydrogenation rate of the hydrogenated product of the ring-opening polymer was 99.9%.

Subsequently, the solution obtained by the aforementioned filtration was treated at a temperature of 270° C. and a pressure of 1 kPa or less using a cylindrical concentration dryer (manufactured by Hitachi, Ltd.) to remove the solvent cyclohexane and other volatile matter from the solution. Then, the solid content having been contained in the solution was extruded in a molten state into a strand shape through a die directly connected to the concentrator, and cooled. Thus, a pellet of the hydrogenated product of the ring-opening polymer was obtained. The weight-average molecular weight (Mw) of the hydrogenated product of the ring-opening polymer constituting the pellet was 38,000, the molecular weight distribution (Mw/Mn) was 2.5, and the glass transition temperature Tg was 129° C. This hydrogenated product of the ring-opening polymer is a material having a positive intrinsic birefringence value.

The obtained pellet was molded into a film shape by a melt extrusion method. Thus, a long-length pre-stretch film having a thickness of 45 μm was obtained. This long-length pre-stretch film was stretched in the lengthwise direction which formed an angle of 90° with respect to the width direction to obtain a long-length substrate layer having a phase difference with an NZ factor of 1.0. The stretching conditions at this time were set within the stretching temperature of 120° C. to 150° C. and the stretch factor of 1.1 times to 2.0 times such that Re became 140 nm, and Rth became 70 nm. The obtained substrate layer had a slow axis in its lengthwise direction.

(1-3. Production of Polarizing Plate (Light Source Side and Viewing Side))

The long-length polarizer obtained in (1-1) and the long-length substrate layer obtained in (1-2) were trimmed to obtain a polarizer in a sheet piece shape and a substrate layer in a sheet piece shape, respectively.

The sheet piece polarizer and the sheet piece substrate layer were bonded with a sticky adhesive agent (manufactured by Nitto Denko Corporation, trade name "CS9621"). Upon bonding, the sheet polarizer and the sheet substrate layer were positioned such that the absorption axis of the polarizer and the slow axis of the substrate layer were parallel to each other. Accordingly, there was obtained a polarizing plate (light source-side and viewing-side) which included the polarizer, the layer of the sticky adhesive agent, and the substrate layer in this order.

(1-4. Production and Visual Evaluation of Liquid Crystal Display Device)

A commercially available liquid crystal display device with an IPS panel (iPad 2 manufactured by Apple Inc.) was prepared. The IPS panel was removed from this device. This IPS panel included polarizing plates on the light source side and on the viewing side. The absorption axes of these polarizing plates were disposed in directions orthogonal to each other.

The polarizing plates on the light source side and on the viewing side were removed from the IPS panel. Instead, two polarizing plates produced in the aforementioned (1-3) were each bonded as the light source-side polarizing plate and the viewing-side polarizing plate. The polarizing plates were bonded such that the surface on the side of the substrate layer faces a liquid crystal cell. The directions of the absorption axes of the polarizing plates were the same as those of the removed original polarizing plates. Accordingly, there was obtained a liquid crystal display device having the structure schematically illustrated in FIG. 2. The obtained liquid crystal display device was visually evaluated.

(1-5. Evaluation by Simulation)

A liquid crystal display device which included the polarizing plates produced in the aforementioned (1-3) and had the structure schematically illustrated in FIG. 1 was modeled, and evaluation by simulation for chroma C* was performed.

Example 2

(2-1. Production of Substrate Layer (First and Second))

Using a tenter stretching machine, a long-length pre-stretch film which was the same as that used in (1-2) of Example 1 was stretched in the width direction. Thus, there was obtained a long-length substrate layer having an NZ factor of 1.2. The stretching conditions at this time were set within the stretching temperature of 120° C. to 150° C. and the stretch factor of 1.3 times to 2.2 times such that Re became 140 nm, and Rth became 98 nm. The obtained substrate layer had a slow axis in its width direction.

(2-2. Production and Evaluation of Polarizing Plate and Liquid Crystal Display Device)

A polarizing plate and a liquid crystal display device were produced and evaluated in the same manner as those in (1-1) and (1-3) to (1-5) of Example 1, except that the substrate layer obtained in (2-1) was used in place of the substrate layer obtained in (1-2) of Example 1.

Example 3

(3-1. Production of Substrate Layer (First and Second))

A long-length pre-stretch film which was the same as that used in (1-2) of Example 1 was stretched in the lengthwise direction which formed an angle of 90° with respect to the width direction thereof. Thus, there was obtained a long-length substrate layer having an NZ factor of 1.0. The stretching conditions at this time were set within the stretching temperature of 120° C. to 150° C. and the stretch factor of 1.5 times to 2.4 times such that Re became 280 nm, and Rth became 140 nm. The obtained substrate layer had a slow axis in its lengthwise direction.

(3-2. Production and Evaluation of Polarizing Plate and Liquid Crystal Display Device)

A polarizing plate and a liquid crystal display device were produced and evaluated in the same manner as those in (1-1) and (1-3) to (1-5) of Example 1, except that the substrate layer obtained in (3-1) was used in place of the substrate layer obtained in (1-2) of Example 1.

Example 4

(4-1. Production of Substrate Layer (First and Second))

Using a tenter stretching machine, a long-length pre-stretch film which was the same as that used in (1-2) of Example 1 was stretched in the width direction. Thus, there was obtained a long-length substrate layer having an NZ factor of 1.2. The stretching conditions at this time were set within the stretching temperature of 120° C. to 150° C. and the stretch factor of 3.6 times to 4.5 times such that Re became 280 nm, and Rth became 196 nm. The obtained substrate layer had a slow axis in its width direction.

(4-2. Production and Evaluation of Polarizing Plate and Liquid Crystal Display Device)

A polarizing plate and a liquid crystal display device were produced and evaluated in the same manner as those in (1-1) and (1-3) to (1-5) of Example 1, except that the substrate layer obtained in (4-1) was used in place of the substrate layer obtained in (1-2) of Example 1.

Example 5

(5-1. Production of Substrate Layer (Zero Phase Difference Film, Second))

As the second substrate layer, there was prepared a long-length thermoplastic resin film (manufactured by ZEON Corporation, a film of a norbornene-based polymer with a thickness of 13 μm and Tg of 138° C.). The phase difference of this film was measured. The result was that Re was 0.8 nm, and Rth was 3.7 nm. Thus, it was confirmed that this film was available as a zero phase difference film.

(5-2. Production of Viewing-Side Polarizing Plate (Including Second Polarizer and Second Substrate Layer))

A viewing-side polarizing plate (including the second polarizer and the second substrate layer) which included a polarizer, a layer of a sticky adhesive agent, and a substrate layer in this order was obtained in the same manner as that in (1-3) of Example 1, except that the substrate layer prepared in (5-1) was used in place of the long-length substrate layer obtained in (1-2) of Example 1, and the absorption axis of the polarizer and the slow axis of the substrate layer were not particularly positioned when bonded.

(5-3. Production and Evaluation of Polarizing Plate and Liquid Crystal Display Device)

A polarizing plate and a liquid crystal display device were produced and evaluated in the same manner as that in Example 1, except that the viewing-side polarizing plate obtained in (5-2) was used in place of the polarizing plate obtained in (1-3) of Example 1 as the viewing-side polarizing plate. The obtained liquid crystal display device was a device having the structure schematically illustrated in FIG. 3.

Example 6

(6-1. Production of Light Source-Side Polarizing Plate (Including First Polarizer and First Substrate Layer))

A light source-side polarizing plate (including the first polarizer and the first substrate layer) was obtained in the same manner as that in (1-3) of Example 1, except that the substrate obtained in (2-1) of Example 2 was used in place of the substrate obtained in (1-2) of Example 1.

(6-2. Production and Evaluation of Liquid Crystal Display Device)

A liquid crystal display device was produced and evaluated in the same manner as those in (1-4) to (1-5) of Example 1, except that the viewing-side polarizing plate obtained in (5-2) of Example 5 was used in place of the polarizing plate obtained in (1-3) of Example 1 as the viewing-side polarizing plate, and the light source-side polarizing plate obtained in (6-1) was used in place of the polarizing plate obtained in (1-3) of Example 1 as the light source-side polarizing plate. The obtained liquid crystal display device was a device having the structure schematically illustrated in FIG. 3.

Example 7

(7-1. Production of Polarizing Plate (Light Source Side and Viewing Side))

A long-length cyclic olefin resin film (manufactured by ZEON Corporation, a film of a norbornene-based polymer with a glass transition temperature of 100° C. and a thickness of 43.2 μm) was prepared as the pre-stretch film. Onto this long-length pre-stretch film, an adhesive agent (trade name "Gohsenol Z200", 5% aqueous solution, manufactured by The Nippon Synthetic Chemical Industry Co., Ltd.) was applied to form a layer of the adhesive agent. On the layer of the adhesive agent, a polyvinyl alcohol resin film was further bonded to obtain a long-length pre-stretch layered body.

This pre-stretch layered body was stretched in the lengthwise direction which formed an angle of 90° with respect to the width direction. Thus, a long-length stretched layered body was obtained. The stretching conditions at this time were set to a stretching temperature of 130° C. and a stretch factor of 6 times. By such stretching, there was obtained a substrate layer in which a phase difference was imparted to the pre-stretch film which had constituted the pre-stretch layered body.

Subsequently, the layer of the polyvinyl alcohol resin of the stretched layered body was stained with iodine to form a polarizer. Accordingly, there was obtained a polarizing plate (light source-side and viewing-side) which included the polarizer, the layer of the adhesive agent, and the substrate layer in this order.

This polarizing plate had an absorption axis in its lengthwise direction and a transmission axis in its width direction. The substrate layer was peeled from a part of the polarizing plate, and the phase difference and film thickness of the substrate layer were measured. The result was that Re was 47 nm, Rth was 23 nm, and the film thickness was 17.6 μm. The obtained substrate layer had a slow axis in its lengthwise direction.

(7-2. Production and Evaluation of Liquid Crystal Display Device)

A liquid crystal display device was produced and evaluated in the same manner as those in (1-4) to (1-5) of Example 1, except that the polarizing plate obtained in (7-1) was used as the polarizing plates on the light source side and on the viewing side in place of the polarizing plate obtained in (1-3) of Example 1. The obtained liquid crystal display device was a device having the structure schematically illustrated in FIG. 1.

Example 8

(8-1. Production of Polarizing Plate (Light Source Side and Viewing Side))

Polarizing plates (light source-side and viewing-side) were obtained in the same manner as that in (7-1) of Example 7, except that the pre-stretch film was changed to another long-length cyclic olefin resin film (manufactured by ZEON Corporation, a film of a norbornene-based polymer with a glass transition temperature of 102° C. and a thickness of 91.4 μm).

This polarizing plate had an absorption axis in its lengthwise direction and a transmission axis in its width direction. The substrate layer was peeled from a part of the polarizing plate, and the phase difference and film thickness of the substrate layer were measured. The result was that Re was 127 nm, Rth was 63 nm, and the film thickness was 37.3 μm. The obtained substrate layer had a slow axis in its lengthwise direction.

(8-2. Production and Evaluation of Liquid Crystal Display Device)

A liquid crystal display device was produced and evaluated in the same manner as those in (1-4) to (1-5) of Example 1, except that the polarizing plate obtained in (8-1) was used as the polarizing plates on the light source side and on the viewing side in place of the polarizing plate obtained in (1-3) of Example 1. The obtained liquid crystal display device was a device having the structure schematically illustrated in FIG. 1.

Comparative Example 1

A liquid crystal display device was produced and evaluated in the same manner as those in (1-1) and (1-3) to (1-5) of Example 1, except that a commercially available TAC film (Re 0.5 nm, Rth 40 nm) was used in place of the substrate layer (first and second) obtained in (1-2) of Example 1.

REFERENCE EXAMPLE

A liquid crystal display device which was modeled and structured in the same manner as that in (1-5) of Example 1, except that a zero phase difference film with an Re of 0.8 nm, an Rth of 3.7 nm, and a thickness of 13 μm was used in place of the first and second substrate layers, was evaluated by the simulation for chroma C*. The result was that the chroma C* was 1.0.

The results of Examples and Comparative Examples are shown in Table 1.

TABLE 1

| | Light source-side polarizing plate | | | | | Viewing-side polarizing plate | | | | | | |
| --- | --- | --- | --- | --- | --- | --- | --- | --- | --- | --- | --- | --- |
| | Substrate | Opical axis angle | Re | Rth | NZ factor | Substrate | Opical axis angle | Re | Rth | NZ factor | Chroma C* | Visual obserbation |
| Ex. 1 | COP | 0 | 140 | 70 | 1.0 | COP | 90 | 140 | 70 | 1.0 | 1.3 | B |
| Ex. 2 | COP | 0 | 140 | 98 | 1.2 | COP | 90 | 140 | 98 | 1.2 | 3.7 | D |
| Ex. 3 | COP | 0 | 280 | 140 | 1.0 | COP | 90 | 280 | 140 | 1.0 | 1.5 | B |
| Ex. 4 | COP | 0 | 280 | 196 | 1.2 | COP | 90 | 280 | 196 | 1.2 | 3.1 | D |

TABLE 1-continued

| | Light source-side polarizing plate | | | | | Viewing-side polarizing plate | | | | | | |
|---|---|---|---|---|---|---|---|---|---|---|---|---|
| | Substrate | Opical axis angle | Re | Rth | NZ factor | Substrate | Opical axis angle | Re | Rth | NZ factor | Chroma C* | Visual obserbation |
| Ex. 5 | COP | 0 | 140 | 70 | 1.0 | ZF14 | — | 0.8 | 3.7 | — | 1.1 | A |
| Ex. 6 | COP | 0 | 280 | 140 | 1.0 | ZF14 | — | 0.8 | 3.7 | — | 1.5 | B |
| Ex. 7 | COP | 0 | 47 | 23 | 1.0 | COP | 90 | 47 | 23 | 1.0 | 1.0 | A |
| Ex. 8 | COP | 0 | 127 | 63 | 1.0 | COP | 90 | 127 | 63 | 1.0 | 1.2 | B |
| Comp. Ex. 1 | TAC | — | 0.5 | 40 | — | TAC | — | 0.5 | 40 | — | 5.0 | E |

In Table 1, the "optical axis angle" is an angle (unit: °) formed between the orientation direction of the liquid crystal substance in the liquid crystal cell when black image is displayed and the in-plane direction of the optical axis (specifically, the slow axis direction in the present example) of the substrate layer in the polarizing plate.

As apparent from the aforementioned results, coloring on the black image when the display surface is observed in an oblique direction in the liquid crystal display device according to the present invention is suppressed to a low level such that the coloring is comparable to that in the Reference Example in which a zero phase difference film was used as the first and second substrate layers. Consequently, it is confirmed that the liquid crystal display device according to the present invention can be produced in an inexpensive and efficient manner while having favorable display quality.

REFERENCE SIGN LIST

10: liquid crystal display device
111: first polarizer
112: second polarizer
121: first substrate layer
122: second substrate layer
130: liquid crystal cell
131: light source-side substrate
132: viewing-side substrate
133: liquid crystal substance
222: second substrate layer
322: second substrate layer
A111: absorption axis of the first polarizer
A112: absorption axis of the second polarizer
A121: in-plane direction of optical axis of first substrate layer
A122: in-plane direction of optical axis of second substrate layer
A130: orientation axis of liquid crystal substance

The invention claimed is:

1. A liquid crystal display device comprising:
a first polarizer;
a liquid crystal cell in which an azimuth orientation direction of a liquid crystal substance is altered by an electric field parallel to a display surface; and
a second polarizer, which are disposed in this order from a light source side, wherein
an absorption axis of the first polarizer and an absorption axis of the second polarizer are disposed in directions orthogonal to each other,
the absorption axis of the first polarizer and an orientation axis of molecules of the liquid crystal substance of the liquid crystal cell are disposed in parallel to each other,
the liquid crystal display device further comprises:
a first substrate layer between the liquid crystal cell and the first polarizer; and
a second substrate layer as only one layer between the liquid crystal cell and the second polarizer,
an in-plane direction of an optical axis of the first substrate layer is parallel to the absorption axis of the first polarizer,
one or both of the first substrate layer and the second substrate layer are formed of a material having a positive intrinsic birefringence value,
an NZ factor of the first substrate layer and an NZ factor of the second substrate layer both fall within a range of 0.9 to 1.5,
both an in-plane phase difference Re of the first substrate layer and an in-plane phase difference Re of the second substrate layer are in a range of 127 nm to 280 nm, and
the second polarizer and the second substrate layer are a second co-stretched polarizing plate obtained by a step of stretching a second pre-stretch layered body containing a second hydrophilic polymer layer and a second pre-stretch film to obtain a second stretched layered body.

2. The liquid crystal display device according to claim 1, wherein an in-plane direction of an optical axis of the second substrate layer is parallel to the absorption axis of the second polarizer.

3. The liquid crystal display device according to claim 1, wherein the first polarizer and the first substrate layer are a first co-stretched polarizing plate obtained by a step of stretching a first pre-stretch layered body containing a first hydrophilic polymer layer and a first pre-stretch film to obtain a first stretched layered body.

4. The liquid crystal display device according to claim 1, wherein the NZ factor of the first substrate layer and the NZ factor of the second substrate layer both fall within a range of 0.9 to 1.0.

5. The liquid crystal display device according to claim 4, wherein the first polarizer and the first substrate layer are a first co-stretched polarizing plate obtained by a step of stretching a first pre-stretch layered body containing a first hydrophilic polymer layer and a first pre-stretch film to obtain a first stretched layered body.

* * * * *